3,188,299
PREPARATION OF STABLE MIXTURES OF OR-
GANOSILICON COMPOSITIONS IN THE PRES-
ENCE OF A NITROGEN-CONTAINING LIGAND
Alan J. Chalk, Scotia, N.Y., assignor to General Electric
Company, a corporation of New York
No Drawing. Filed Feb. 28, 1963, Ser. No. 261,855
24 Claims. (Cl. 260—46.5)

The invention is concerned with the production of stable mixtures of copolymerizable organosilicon compositions containing a platinum catalyst. More particularly, the invention relates to a process for reducing the activity of a platinum catalyst in the presence of a mixture of reactants comprising (a) an alkenyl polysiloxane having structural units of the formula

I 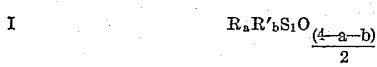

and (b) a hydrogen polysiloxane having structural units of the formula

II 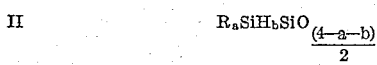

where R is an organic radical attached to silicon by a C-Si linkage and is selected from the class consisting of monovalent hydrocarbon radicals, halogenated monovalent hydrocarbon radicals and cyanoalkyl radicals, R' is an organic radical attached to silicon by a C-Si linkage and contains aliphatic carbons linked by multiple bonds (e.g., vinyl, allyl, methallyl, butenyl, ethinyl, etc.), $a$ has a value of from 0 to 3, inclusive, and preferably from 0.5 to 2, $b$ has a value from 0.005 to 2.0, inclusive, and the sum of $a+b$ is equal to from 1.0 to 3, inclusive, which process comprises incorporating in the platinum-containing mixture of ingredients a nitrogen-containing ligand selected from the class consisting of aromatic nitrogen heterocyclics free of nitrogen-bonded hydrogen (e.g., pyridine, including alkyl substituted pyridines in which the alkyl group contains from 1 to 2 carbon atoms, 2,2'-bipyridine, naphthyridine, 2,2'-biquinoline, etc.), dialkyl formamides of the formula

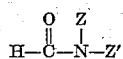

thioamides of the formula

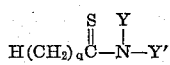

alkyl thioureas of the formula

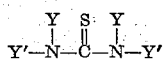

and ethylene thiourea, where Z and Z' are alkyl radicals selected from the class consisting of methyl and ethyl radicals, Y and Y' are members selected from the class consisting of hydrogen and the same alkyl radicals as Z, and $q$ is a whole number from 0 to 1. In the above formulas Y and Y', and Z and Z' can be the same or different. The invention also includes coreactable or copolymerizable compositions composed of the aforesaid alkenyl polysiloxane and hydrogen polysiloxane in which the activity of the platinum catalyst is reduced or temporarily inhibited by the presence of the above ligands.

It is known in the art that a number of platinum-containing materials will catalyze the addition of silicon-bonded hydrogen across the double bonds of carbons separated by olefinic unsaturation (this coreaction will also be referred to hereinafter as "copolymerization"). Thus, U.S. Patent 2,970,150—Bailey, shows the use of a platinum-on-charcoal catalyst for the addition of organopolysiloxanes containing silanic hydrogen (Si-H) to compounds containing olefinic unsaturation. U.S. Patent 2,823,218—Speier et al., shows the use of chloroplatinic acid for the same types of reaction. In the copending applications (all of which are assigned to the same assignee as the present invention) of Bruce A. Ashby, Serial No. 207,059, now United States Patent No. 3,159,662 and Serial No. 207,060, now United States Patent No. 3,159,601, and in the copending application of Harry F. Lamoreaux, Serial No. 207,076, all filed July 2, 1962, are disclosed and claimed other types of platinum-containing catalysts for the addition of organopolysiloxanes containing silanic hydrogen to compounds containing olefinic unsaturation.

The processes described in the aforesaid Ashby and Lamoreaux applications are especially adaptable to reacting low molecular weight organopolysiloxanes (free of olefinic unsaturation) containing silanic hydrogen with low molecular weight organopolysiloxanes containing olefinic unsaturation and free of any silanic hydrogen, to form high molecular weight copolymers by the addition of the silanic hydrogen to the olefinic unsaturation. It is often desirable to incorporate the platinum catalyst designed to effect this addition reaction, in the mixture of organopolysiloxanes and carry out this addition reaction at some future time by the application of heat. Unfortunately, such mixtures of the aforesaid organopolysiloxanes and the platinum catalyst do not have the shelf life or the ability to remain stable or unchanged at ambient or room temperatures (about 20–30 C.) for sufficient periods of times required for commercial exploitation. Thus, it has been found that in many instances, on standing, the platinum-containing catalyst causes the mixture of ingredients to increase undesirably in viscosity and therefore in molecular weight; often this increase in viscosity and molecular weight is so rapid that before use is made of the mixture, it has gelled to a state which has no utility.

I have now discovered that a mechanical mixture or a preformed complex of a platinum-containing catalyst and a ligand selected from the class of nitrogen containing compounds described above unexpectedly causes reduced activity of platinum catalysts used to effect addition of the silanic hydrogen of the hydrogen organopolysiloxane to the olefinic unsaturation of the alkenyl polysiloxane. This stability or reduced activity is particularly noticeable at temperatures of the order of from about 20–30° C. If at some future time it should be desired to reactivate the platinum catalyst to overcome the inhibiting effect of the ligand so as to effect addition of the silanic hydrogen to the olefinic unsaturation, it is only necessary to heat the mixture of ingredients at a temperature in excess of 40° C., for instance, at temperatures above 60° C.

In the description which follows, the following definitions will be used:

"Alkenyl polysiloxane" is intended to cover organopolysiloxanes preferably but not essentially free of silanic hydrogen but containing olefinic unsaturation by means of a double or triple bond between two adjacent aliphatic carbon atoms (Formula I).

"Hydrogen polysiloxane" is intended to cover organopolysiloxanes preferably but not essentially free of olefinic unsaturation but containing silanic hydrogen in the form of $\equiv$SiH (Formula II).

"Platinum catalyst" is intended to include any platinum-containing composition (other than metallic platinum) suitable for effecting the addition of silanic hydrogen to the above-mentioned olefinic unsaturation, where preferably the platinum catalyst is soluble in either the hydrogen polysiloxane or the alkenyl polysiloxane, or both, or can be incorporated as a solution in a suitable solvent, e.g., ethanol.

"Ligand" is intended to mean the nitrogen-containing compounds which are added to the platinum catalyst to reduce or temporarily inhibit its catalytic activity in the presence of the alkenyl polysiloxane and the hydrogen polysiloxane.

The platinum catalyst employed in the practice of the present invention is one which is soluble in either of the organopolysiloxanes and preferably is soluble in both the hydrogen polysiloxane and the alkenyl polysiloxane. Among such catalysts may be mentioned, platinic chloride, platinum sulfate, salts of chloroplatinous acids such as $Na_2PtCl_4$, chloroplatinic acid, etc. Chloroplatinic acid is one of the more preferred compositions and is most economically obtained as a hexahydrate, $H_2PtCl_6 \cdot 6H_2O$, although the dehydrated form can also be employed.

Another type of soluble platinum catalyst which can be employed in the practice of the present invention with the aforementioned ligands are those described in the above-mentioned copending Lamoreaux application, Serial No. 207,076, which by reference is made part of the disclosures of the instant application. These platinum containing compounds are prepared by (A) forming a reaction mixture of (1) chloroplatinic acid with (2) at least about 2 moles per gram atom of platinum of either an alcohol (e.g., butanol, octyl alcohol, isoamyl alcohol, myricyl alcohol, etc.) or an aldehyde (e.g., amyl aldehyde, octyl aldehyde, tetradecanal, etc.) or an ether (e.g., dibutyl ether, diamyl ether, dimyristyl ether, etc.), and (B) heating said reaction mixture at a temperature of from about 60 to 80° C. at a reduced pressure until the reaction mixture has a ratio of from about 2.0 to about 3.5 atoms of chlorine per atom of platinum.

A detailed description of the method of preparing the platinum-containing catalysts within the scope of the Lamoreaux application is as follows. One mole of chloroplatinic acid hexahydrate and 7 moles of octyl alcohol are mixed together until a homogeneous solution was formed. The reaction mixture is then heated to a temperature of 70° C. and maintained at this temperature under a pressure of 25 millimeters for about 40 hours while continuously removing HCl and water which are formed during the reaction. During the reaction, the chlorine to platinum ratio gradually falls from 6 atoms of chlorine per atom of platinum to 2 atoms of chlorine per atom of platinum. At the end of 40 hours, the reaction mixture is cooled to room temperature and the product is extracted with hexane, filtered, and hexane removed from the filtrate under vacuum. At this point, the catalyst appears to be a complex of $PtCl_2$ and an ether and aldehyde derived from octyl alcohol; specifically, the complex by analysis showed that it contains 1 mole of octyl aldehyde to 2 moles of octyl ether and 1 mole of platinum to 2 moles of chlorine.

Another class of platinum catalysts which can be employed in the practice of the present invention are platinum-olefin complexes characterized by the complexes found in the aforementioned Ashby application, Serial No. 207,060 now United States Patent No. 3,159,601 (which by reference is made part of the disclosure of the instant application) of the formulae:

III  $[PtCl_2 \cdot Olefin]_2$

IV  $H[PtCl_3 \cdot Olefin]$

While the olefin portion of the complexes of Formulae III and IV can be almost any type of olefin, it is preferred that the olefin portion of the complex be a hydrocarbon alkene having from 2 to 10 carbon atoms, a cycloalkene having from 5 to 7 carbon atoms, or styrene. Specific examples of olefins useful in making these platinum-olefin complexes are, e.g.: ethylene, propylene, the various isomers of butylene, octlyene, cyclopentene, cyclohexene, cycloheptene, etc.

The catalysts within the scope of Formulas III and IV are well known in the art, and their preparation and properties are described, for example, in "Coordination Compounds of Olefins with Metallic Salts," R. N. Keller, Chemical Reviews, 1940–41, 27–28, pages 229–267; and Joy and Orchin, Journal of the American Chemical Society, 81, pages 305–311 (1959).

A still further class of platinum catalyst useful in the practice of the present invention for reaction with the ligand are those disclosed and claimed in the aforesaid Ashby application, Serial No. 207,059 now United States Patent No. 3,159,662, comprising a platinum-cyclopropane complex having the formula V  $(PtCl_2 \cdot C_3H_6)_2$ The platinum-cyclopropane complex of Formula V is a light yellow powder and is known in the art. For example, this complex of Formula V is shown by C. F. H. Tipper, J. Chem. Soc. 2045–6 (1955). The platinum-cyclopropane complex can be prepared by several methods. One of the methods is that shown by Tipper, which involves the reaction between cyclopropane and chloroplatinic acid. Another method of forming the complex of Formula V is by effecting reaction between a platinum-ethylene complex having the formula $(PtCl_2 \cdot C_2H_4)_2$ and cyclopropane. The platinum-ethylene complex is also well known in the art and is described in the aforesaid articles by Keller and by Joy and Orchin (supra).

A still further class of platinum catalysts which can be employed with the ligands herein described are those platinum complexes which are in the form of platinum carboxylates. These platinum carboxylates can be obtained by reacting a platinum halide (e.g., platinum chloride) and a water soluble salt of an organic acid in the molar ratio of from 3 to 6 or more moles of the salt of the organic acid per mole of the platinum halide, advantageously employing water or an aliphatic alcohol as the medium in which the reaction is carried out. Any platinum halide can be employed as, for instance, platinic chloride, platinic bromide, platinous bromide, platinic chloride octahydrate ($PtCl_4 \cdot 8H_2O$), chloroplatinic acid ($H_2PtCl_6 \cdot 6H_2O$), etc.

Among such salts may be mentioned the alkali-metal salts of monocarboxylic acids (both saturated and aromatic acids), for instance, the alkali-metal salts of butyric, hexanoic, octanoic, benzoic, etc., acids. The inorganic portion of the water-soluble salt may be for instance sodium, potassium, cesium, ammonium, etc. The proportions of ingredients used to make the platinum carboxylate can be varied widely and this method yields a soluble platinum salt (or carboxylate) with a minimum of processing. The platinum salt precipitates from the aqueous solution if a suitable alkali-metal salt of a carboxylic acid is used. When an alcohol is used (e.g., ethanol) as the medium, the desired platinum salt remains in solution but the ionic salt, e.g., the sodium chloride, precipitates. Although the structure of this salt is not known precisely, nevertheless it is believed that when water is used as the medium these platinum carboxylates can be assigned the empirical formula

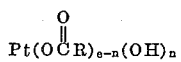

where R is a monovalent hydrocarbon radical or halogen-substituted hydrocarbon radical which R in Formula I represents, and $n$ is a value from 0 to 1, inclusive, and $e$ is either 2 or 4. Where the medium is an aliphatic alcohol, $n=0$ and the platinum carboxylate is substantially free of platinum-bonded hydroxyl groups.

Among the organic radicals which R in Formulae I and II may represent are, e.g., monovalent hydrocarbon radicals free of olefinic unsaturation, halogenated monovalent hydrocarbon radicals free of olefinic unsaturation, cyanoalkyl radicals, etc. More particularly, radicals represented by R include alkyl radicals (e.g., methyl, ethyl, propyl, isopropyl, butyl, octyl, etc., radicals); cycloalkyl radicals (e.g., cyclopentyl, cyclohexyl, cycloheptyl, etc., radicals); aryl radicals (e.g., phenyl, naphthyl, tolyl, xylyl, etc., radicals); aralkyl radicals (e.g., benzyl, phenylethyl, phenylpropyl, etc., radicals); halogenated derivatives of the above radicals, including chloromethyl, chloropropyl, trifluoromethyl, chlorophenyl, dibromophenyl, tetrachlorophenyl, difluorophenyl etc., radicals; and cyanoalkyl radicals, e.g., beta-cyanoethyl, gamma-cyanopropyl, beta-cyanopropyl, etc. radicals. Preferably, at least 25 percent and as much as 50 percent of the R groups attached to silicon in the polysiloxanes of Formulae I and II are methyl radicals, and R' is preferably an alkenyl radical, e.g., vinyl, allyl, methallyl, butenyl, etc.

The hydrogen polysiloxanes which are employed in the practice of the present invention can also be characterized as copolymers containing at least one unit per molecule having the formula:

VI 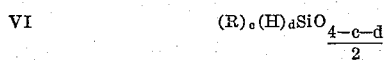

with the remaining siloxane units in the organopolysiloxane having the average formula:

VII 

where R is as previously defined, $c$ has a value of from 0 to 2, inclusive, $d$ has a value of from 1 to 2, inclusive, and the sum of $c$ plus $d$ is equal to from 1.0 to 3.0, inclusive, and $n$ has a value of from 1.0 to 2.5, inclusive. Within the scope of Formula VI are siloxane units such as hydrogen siloxane $(HSiO)_{1.5}$, methyl hydrogen siloxane units $(HSiCH_3O)$, dimethyl hydrogen siloxane units, and dihydrogen siloxane units $(H_2SiO)$. The copolymers containing the siloxane units of Formula VI and the siloxane units of Formula VII are present in proportions so as to form a hydrogen polysiloxane within the scope of Formula II. In general, the copolymers contain from 0.5 to 99.5 mole percent of the siloxane units of Formula VI with from 0.5 to 99.5 mole percent siloxane units of Formula VII.

The hydrogen polysiloxanes are well known in the art and include such materials as 1,3-dimethyldisiloxane, 1,1,3-trimethyldisiloxane, 1,1,3,3-tetramethyldisiloxane as well as higher polymers containing up to 100,000 or more silicon atoms per molecule. Also included within the scope of Formula II are cyclic materials such as the cyclic polymers of methyl hydrogen siloxane having the formula $$(CH_3SiHO)_x$$

where $x$ is a whole number equal to from 3 to 10 or more.

The alkenyl polysiloxanes of Formula I which are employed in the practice of the present invention are also well known in the art and can also be characterized as copolymers of (1) siloxane units having the formula:

VIII 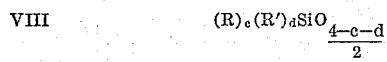

where R, R', $c$, $d$ and the sum of $c$ plus $d$ are as previously defined, with (2) an organopolysiloxane within the scope of Formula VII. Where the alkenyl polysiloxane is a copolymer of units within the scope of Formula VIII with an organopolysiloxane having an average formula within the scope of Formula VII, the copolymer generally contains from 0.5 to 99.5 mole percent of the units of Formula VIII, and from 0.5 to 99.5 mole percent of units within the scope of Formula VII.

The preparation of the unsaturated organopolysiloxanes within the scope of Formula I is well known in the art. Included within the scope of the siloxanes of Formula II are low molecular weight materials such as vinylpentamethyldisiloxane, 1,3-divinyltetramethyldisiloxane, 1,1,3-trivinyltrimethyldisiloxane, 1,1,3,3-tetravinyldimethyldisiloxane as well as higher polymers containing up to 100,000 or more silicon atoms per molecule. Also included among the alkenyl polysiloxanes within the scope of Formula I are cyclic materials containing silicon-bonded vinyl or allyl radicals, such as the cyclic trimer, tetramer or pentamer of methylvinyl siloxane $$[(CH_2{=}CH)(CH_3)SiO]$$

or methyl allylsiloxane $[(CH_2{=}CH{-}CH_2)(CH_3)SiO]$.

The ligands employed in the practice of the present invention for combination with the platinum catalyst may be used as admixtures with the platinum catalyst in combination with the alkenyl polysiloxane and the hydrogen polysiloxane, or the ligand may be reacted with the platinum catalyst before adding it to the mixture of polysiloxanes.

Among the pyridine ligands (in addition to pyridine itself) which may be employed in the practice of the present invention are, for example, the methyl pyridines or picolines containing methyl groups either in the alpha, beta (e.g., α-picoline, β-picoline, etc.), or gamma positions, the various isomers of the dimethyl pyridines or lutidines (e.g., 2,6-lutidine, 2,3-lutidine, 3,4-lutidine, etc.), the collidines (e.g., 2,3,4-trimethyl pyridine and 3,4,5-trimethyl pyridine), conyrine, the parvulines (those containing four methyl groups), ethyl collidine, pyridazine, pyrazine, 2,2'-biquinoline, quinoline, bipyridine, quinaldine, etc. Such pyridine ligands may be considered as having the general formula

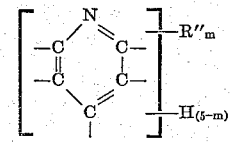

where R'' is a member selected from the class consisting of alkyl groups, preferably of from 1 to 6 carbon atoms (e.g., ethyl, methyl, propyl, isopropyl, amyl, hexyl, etc.) and $m$ is a whole number from 0 to 5, inclusive.

Among the dialkyl formamides which may be employed are, for instance, N,N-dimethyl formamide, N,N-diethyl formamide, and N-methyl-N-ethyl formamide

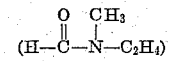

Among the thioamides which may be employed are, for instance, thioformamide, thioacetamide, N,N-dimethyl thioformamide, etc.

Among the alkyl thioureas which may be employed are, for instance, N,N'-dimethyl thiourea, N,N,N',N'-tetramethyl thiourea, N,N'-diethyl thiourea, etc.

In carrying out the process of the present invention, preferably the platinum catalyst and the ligand are mixed together and this mixture is added to the mixture of the alkenyl polysiloxane and the hydrogen organopolysiloxane in the desired proportions. In this condition, the mixture of ingredients can be maintained at temperatures of from about 20–30° C. and sometimes even higher for extended periods of time, even as long as many months, without any undesirable change in the viscosity of the mixture. Alternatively the platinum catalyst, preferably in the platinous form and the ligand can be reacted together to form a preformed platinous-ligand complex which in turn can be added to the mixture of coreactive polysiloxanes.

The proportions of the various ingredients employed in the practice of the present invention can vary within extremely wide limits and these proportions of the ingredients are not affected by the stoichiometry of the addition reactants involved since many of the products prepared by the process of this invention exhibit satisfactory properties for intended purposes even when the final product contains unreacted silicon-bonded alkenyl radicals or contains unreacted silicon-hydrogen linkages. However, for economic reasons, it is generally preferred that the alkenyl polysiloxane and the hydrogen polysiloxane be present in such proportions that the reaction mixture contains from about 0.005 to 20 silicon-hydrogen linkages per silicon-bonded alkenyl radical. Also, it is desirable to have an equal number of silicon-hydrogen linkages and alkenyl radicals in the reaction mixture so as to produce a final product which would be substantially free of either silicon-hydrogen linkages or silicon-bonded alkenyl radicals.

The platinum catalyst is generally added to the reaction mixture in an amount related to the amount of alkenyl (e.g., vinyl or allyl) radicals in the alkenyl polysiloxane to be reacted. One especially desirable feature of the present invention is that the platinum catalyst can be added in a variety of concentrations and still act satisfactorily as the catalyst for the addition of the silanic hydrogen to the alkenyl radicals, relying on the ability of the ligand to retard the activity of the platinum catalyst until such time as it is desired to reactivate the platinum catalyst by means of elevated temperatures. Satisfactory action can occur when the platinum catalyst is present in amounts sufficient to provide as little as one atom of platinum per million silicon-bonded alkenyl groups in the alkenyl polysiloxane. Amounts of the platinum catalyst sufficient to provide as high as one to ten platinum atoms per 1000 silicon-bonded alkenyl radicals can also be employed. In general it is preferred to employ the platinum catalyst in an amount sufficient to provide one platinum atom per one thousand to one million silicon-bonded alkenyl groups in the alkenyl polysiloxane to be reacted.

When employing exceptionally small quantities of the platinum catalyst, it is often desirable to dissolve the latter in a solvent which is inert to the reactants under the conditions of the reaction so as to facilitate uniform dispersion or solution of the platinum catalyst in the alkenyl polysiloxane and the hydrogen polysiloxane. Suitable solvents include, for example, hydrocarbon solvents such as xylene, benzene, toluene, halogenated alkanes, mineral spirits and the like, as well as oxygenated solvents, such as dioxane, ethanol, butanol, tetrahydrofuran, etc. Where a diluent or solvent is employed, the amount of the latter is not critical. Satisfactory solutions of platinum catalysts can be prepared which contain from about 0.1–0.0001 gram of platinum catalyst per gram of solvent.

The amount of nitrogen-containing ligand used can also be varied depending on such characteristics as the type and amount of platinum catalyst used, the degree of inactivity desired to impart to the platinum catalyst, and very often the type of alkenyl polysiloxane and hydrogen polysiloxane employed. Generally, it is desirable that the ligand be employed in an amount in excess of 1 mole of the ligand per mole of the platinum catalyst, and preferably from 2 to 1000 or more moles of the ligand per mole of platinum catalyst. If increased inhibition is desired, the amount of the ligand will be increased, while if it is desired that the catalyst be activated at a lower temperature or more rapidly, then the amount of ligand used will be smaller. As the concentration of the platinum catalyst increases in the mixture of the alkenyl polysiloxane and the hydrogen polysiloxane, the rate of reaction at elevated temperature will also be increased and will correspondingly require a larger amount of the ligand to suppress the activity at the temperature at which the mixture of the ingredients will be stored.

The characteristics of the products prepared in accordance with the process of the present invention can vary greatly with the nature of the starting materials. For example, when a reaction mixture comprises vinyl pentamethyldisiloxane and pentamethyldisiloxane, reaction products of the material contain two disiloxanes joined by a silethylene group. In the case of a reaction mixture which contains a compound such as 1,1,3,3-tetramethyldisiloxane and a higher molecular weight organopolysiloxane containing a plurality of silicon-bonded vinyl or allyl groups per molecule, the resulting product is a cross-linked silicone.

If at some future time, it is desired to effect the addition reaction between the alkenyl radical and the silanic hydrogen, one can heat the mixture of ingredients at elevated temperatures, for example, temperatures ranging from as low as 50° C. up to temperatures of the order of 150° C. or even higher.

The time required for effecting the final addition reaction can also vary within wide limits depending upon the particular reactants involved, the proportions of the reactants, the reaction temperature, and the type and amount of platinum catalyst used, the type and concentration of the ligand, etc. By suitable selection of the platinum catalyst, ligand and reactants, reaction can be effected in times which may vary from a few minutes up to 24 hours or more. If all other factors are equal, the rate of reaction increases as the temperature and as the concentration of the platinum catalyst increase and as the concentration of the ligand decreases.

In order that those skilled in the art may better understand how the present invention can be practiced, the following examples are given by way of illustration and not by way of limitation. All parts and percents are by weight.

EXAMPLE 1

The platinum catalyst used in this example was prepared by dissolving one part by weight chloroplatinic acid hexahydrate in 110 parts, by weight, of ethyl alcohol. The alkenyl polysiloxane and hydrogen polysiloxane employed in this example were present in equal parts (10 parts), by weight, and were respectively, the vinyl methyl cyclopolysiloxane having the formula $[(CH_2=CH)(CH_3)SiO]_4$ and the methyl hydrogen cyclopolysiloxane having the formula $[CH_3SiHO]_4$. To the alcoholic solution of the platinum catalyst were added varying amounts of the ligand modifying agent and each mixture of platinum catalyst and modifying agent was added to the mixture of cyclic polymers again in varying proportions. The various mixtures containing the different concentrations of the modifying agent were then tested by heating at different temperatures. The following Table I shows the percent, by weight, of platinum catalyst in the form of chloroplatinic acid, and the percent, by weight, of modifying agent (present in each mixture of ingredients), each of these latter two ingredients being based on the total weight of the vinyl methylpolysiloxane and the methyl hydrogen polysiloxane. Each mixture was heated at the temperature specified in Table I until the liquid polysiloxane mixture was converted to a nonflowing gel; this gel point at which the coreaction product was a soft, resilient, rubber-like product, was taken as the reference point for time stability.

*Table I*

| Wt. Percent Platinum as Chloroplatinic Acid | Modifying Agent | Wt. Percent Modifying Agent | Temp., ° C. | Time in Minutes to Gel |
|---|---|---|---|---|
| 0.003 | None | | 80–120 | <1 |
| 0.003 | 2,2'-Biquinoline | 0.1 | 80 | 53 |
| 0.003 | 2-Picoline | 1.0 | 100 | 64 |
| 0.003 | 4-Picoline | 1.0 | 100 | 77 |
| 0.003 | 2,6-Lutidine | 1.0 | 100 | 8 |
| 0.003 | 2,2'-Bipyridine | 0.1 | 120 | >180 |
| 0.003 | Pyridine | 1.0 | 120 | 91 |
| 0.003 | N,N'-Dimethyl formamide | 1.0 | 120 | 137 |
| 0.003 | N,N-Diethyl formamide | 1.0 | 120 | 210 |
| 0.003 | Thioacetamide | 0.1 | 120 | >400 |
| 0.003 | Ethylene thiourea | 0.02 | 120 | >180 |
| 0.003 | N,N'-Diethyl thiourea | 0.02 | 120 | >150 |
| 0.003 | Quinoline | 1.0 | 80 | >300 |
| 0.003 | do | 1.0 | 100 | >120 |

When for comparison purposes nitrogen-free or nitrogen-containing compounds which had structures not too different from those found effective for reducing the activity of the platinum catalyst were used in place of the ligands of Table I, it was found that the inhibiting effect was negligible. Thus, when using the same weight amounts of tetrameric methyl vinyl siloxane and tetrameric methyl hydrogen siloxane employed in Example 1 and employing 0.003 percent platinum as chloroplatinic acid and 1.0 percent of modifying agents such as pyrrole, acetamide, formamide, diphenyl formamide, N-methyl formanilide, diamyl sulfide, diphenyl sulfide, methyl formate, N,N'-diphenyl thiourea, and thiophene, in each instance, at 120° C., a gel gas formed in less than one minute.

EXAMPLE 2

In this example, a preformed complex of a platinum halide and a nitrogen-containing modifying agent, specifically pyridine, was prepared in advance of adding the complex to the mixture of hydrogen polysiloxane and alkenyl polysiloxane of Example 1. The preformed complex which had the formula $PtCl_2(C_5H_5N)_2$ was prepared by dissolving one part of anhydrous platinous chloride in 250 parts of pyridine and then refluxing the mixture for five minutes. Further information with regard to such complexes are found in the book by N. V. Sidgwick entitled, "Chemical Elements and Their Compounds," vol. II, page 1594, published by the Oxford Press (1951). One part of the above solution of the platinum-pyridine complex was added to 100 parts of the mixture of cyclic polysiloxanes of Example 1, so that the latter contained 0.003% platinum and 1% pyridine. It required 43 minutes at 120° C. before this mixture of ingredients polymerized to a clear gel.

While the foregoing examples are only illustrative of the present invention, it is intended that other platinum catalysts and other nitrogen-containing ligands (either as mechanical mixtures or in the preformed complexed state), many examples of which have been given above, can be used in a wide range of proportions within the scope of the invention.

In addition to the vinyl polysiloxane and hydrogen polysiloxane employed in the foregoing examples, other alkenyl polysiloxanes and hydrogen polysiloxanes can be employed, many of which have been referred to above. Among the alkenyl polysiloxanes which can be used with success is, for example, the trimethyl siloxy chain-stopped methyl vinyl polysiloxane fluid, which can be prepared by conventional procedures from hexamethyldisiloxane, octamethylcyclotetrasiloxane, and tetramethyl tetravinylcyclotetrasiloxane. This fluid, when prepared from the requisite proportions of ingredients, contains about 0.3 mole percent methyl vinylsiloxane units and has a viscosity of about 500 centipoises at 25° C. This vinyl polysiloxane can then be coreacted with a methyl hydrogen polysiloxane fluid which can be prepared, for instance, by the cohydrolysis of methyl dichlorosilane and dimethyl dichlorosilane in amounts sufficient to provide 2.5 mole percent of the methyl hydrogensiloxane unit, which when prepared in the usual fashion, will be found to have a viscosity of 150 centipoises at 25° C. The addition of any of the aforementioned platinum catalysts together with the aforesaid nitrogen-containing compounds yield mixtures which can be maintained in a highly stable condition for long periods of time, but can readily be caused to coreact by raising the temperature sufficiently to overcome the inhibiting effect of the nitrogen-containing compound.

A still further vinyl polysiloxane which can be used is a methyl phenylvinylpolysiloxane prepared from hexamethyl disiloxane, octamethylcyclotetrasiloxane, tetrameric methyl phenylcyclopolysiloxane, and the tetrameric methyl vinylcyclopolysiloxane. By proper selection of the coreactants in making this methyl phenylvinylpolysiloxane, one can obtain a fluid having a viscosity of about 1500 centipoises at 25° C. and containing 0.5 mole percent methyl vinylsiloxane units and 27.8 mole percent methyl phenylsiloxane units.

A still further hydrogen polysiloxane which can be employed in combination with the alkenyl polysiloxane is one prepared by cohydrolyzing $CH_3SiHCl_2$, $(CH_3)(C_6H_5)SiCl_2$, and $(CH_3)_2SiCl_2$, which by proper choice of the ingredients, will yield a fluid of about 300 centipoise viscosity at 25° C. and will contain 5 mole percent $CH_3SiHO$ units and 24 mole percent $$(CH_3)(C_6H_5)SiO$$

units.

The proportions of ingredients including the platinum catalyst, the nitrogen-containing ligand, alkenyl polysiloxane and hydrogen polysiloxane can be varied within wide limits as recited previously without departing from the scope of the invention.

Where it is desirable to interact an olefinic monomer (e.g., styrene, diallyl phthalate, vinyl acetate, etc.) with organosilicon compositions containing silanic hydrogen (for example, trimethylsilane, diphenylsilane, methyldichlorosilane, etc.), one can use the same platinum catalyst system as employed above, and moderate the rate of reaction between the unsaturated compound and the composition containing silicon-bonded hydrogen by incorporating the aforementioned class of ligand.

The products prepared by the addition of the coreactants described in the instant application have utility in various fields. Thus, the products formed from reacting the alkenyl polysiloxane with the hydrogen polysiloxane can be used in conventional silicone polymer applications. For example, it is possible to prepare these coreaction products in any shape desired, either in the unsupported or supported state. Those materials which ordinarily are rubbery polymers can be used as gaskets and the like similar to the manner in which conventional silicone rubbers are employed. Those materials which are resinous in character can be used as insulation for electrical conductors and after effecting the coreaction at the elevated temperatures between the alkenyl polysiloxane and hydrogen polysiloxane, the electrical conductors can be used for conventional applications. The coreacted composition can also be used as potting gels for various types of electrical equipment, e.g., in making capacitors and the like.

What I claim as new and desire to secure by Letters Patent of the United States is:

1. The process for reducing the activity of a platinum catalyst employed to effect copolymerization of a mixture of copolymerizable ingredients comprising (*a*) an olefinic polysiloxane having units of the formula $$R_aR'_bSiO_{\frac{(4-a-b)}{2}}$$

and (*b*) a hydrogen polysiloxane having units of the formula $$R_aSiH_bSiO_{\frac{(4-a-b)}{2}}$$

which process comprises incorporating in the mixture of ingredients a nitrogen-containing ligand selected from the class consisting of aromatic heterocyclic nitrogen compound having the formula $$\left[\begin{array}{c} -C \overset{N}{\underset{\|}{\diagup}} \overset{}{\diagdown} C- \\ -C \underset{\diagdown}{\|} \overset{}{\diagup} C- \\ C \\ | \end{array}\right] \begin{array}{c} -R''_m \\ \\ -H_{5-m} \end{array}$$

where R'' is an alkyl group of from 1 to 6 carbon atoms, and *m* is a whole number of from 0 to 5, inclusive, pyridazine, pyrazine, quinoline, 2,2'-biquinoline, bipyridine, naphthyridine, quinaldine, dialkyl formamides of the formula $$\underset{H-C-N-Z'}{\overset{O\ \ Z}{\underset{\|\ \ |}{}}}$$

thioamides of the formula $$\underset{H(CH_2)_q-C-N-Y'}{\overset{S\ \ Y}{\underset{\|\ \ |}{}}}$$

alkyl thioureas of the formula

and ethylene thiourea, where Z and Z' are alkyl radicals of from 1 to 2 carbon atoms, and Y and Y' are members of the class consisting of hydrogen and alkyl radicals of from 1 to 2 carbon atoms, R is a member selected from the class consisting of alkyl, aryl, aralkyl, alkaryl, halogenated aryl, cyanoalkyl radicals, and mixtures of such radicals, R' is an organic radical selected from the class consisting of vinyl, allyl, methallyl, butenyl and ethinyl radicals, $q$ is a whole number from 0 to 1, inclusive, $a$ has a value from 0 to 3, inclusive, $b$ has a value from 0.005 to 2.0, inclusive, and the sum of $a+b$ is equal to from 1.0 to 3, inclusive.

2. The process as in claim 1 in which the platinum catalyst and the ligand are present in the copolymerizable ingredients as a mechanical mixture.

3. The process as in claim 1 in which the platinum catalyst and the ligand are present in the mixture of copolymerizable ingredients as a complex.

4. The process as in claim 1 in which the nitrogen compound is dimethyl formamide.

5. The process as in claim 1 in which the nitrogen compound is thioacetamide.

6. The process as in claim 1 in which the nitrogen compound is diethyl thiourea.

7. The process as in claim 1 in which the nitrogen compound is ethylene thiourea.

8. The process as in claim 1 in which the nitrogen compound is diethyl formamide.

9. The process for reducing the activity of a platinum halide catalyst used to effect copolymerization of a mixture of copolymerizable ingredients comprising (a) an alkenyl polysiloxane having units of the formula $$R_aR'_bSiO_{\frac{(4-a-b)}{2}}$$

and (b) a hydrogen polysiloxane having units of the formula $$R_aSiH_bSiO_{\frac{(4-a-b)}{2}}$$

which process comprises incorporating an aromatic heterocyclic nitrogen compound in the mixture of ingredients containing the platinum halide having the formula

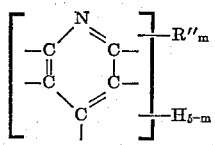

where R" is an alkyl group of from 1 to 6 carbon atoms, and $m$ is a whole number of from 0 to 5, inclusive, R is a member selected from the class consisting of alkyl, aryl, aralkyl, alkaryl, halogenated aryl, cyanoalkyl radicals and mixtures of such radicals, R' is an organic radical selected from the class consisting of vinyl, allyl, methallyl, butenyl, and ethinyl radicals, $a$ has a value from 0 to 3, inclusive, $b$ has a value from 0.005 to 2.0, inclusive, and the sum of $a+b$ is equal to from 1.0 to 3, inclusive.

10. The process as in claim 9 in which the nitrogen compound is pyridine.

11. The process as in claim 9 in which the alkenyl polysiloxane has the formula.

$$[(CH_2=CH)(CH_3)SiO]_4$$

and the hydrogen polysiloxane has the formula $$(CH_3SiHO)_4$$

12. The process for reducing the activity of a platinum halide catalyst used to effect copolymerization of a mixture of copolymerizable ingredients comprising (a) an alkenyl polysiloxane having the formula $$[(CH_2=CH)(CH_3)SiO]_4$$

and (b) a hydrogen polysiloxane having the formula $$(CH_3SiHO)_4$$

which process comprises incorporating pyridine with the platinum halide catalyst in the aforesaid mixture of ingredients.

13. The process for reducing the activity of a platinum halide catalyst used to effect copolymerization of a mixture of copolymerizable ingredients comprising (a) an alkenyl polysiloxane having the formula $$[(CH_2=CH)(CH_3)SiO]_4$$

and (b) a hydrogen polysiloxane having the formula $$(CH_3SiHO)_4$$

which process comprises incorporating thioacetamide with the platinum halide in the mixture of ingredients.

14. The process for reducing the activity of a platinum halide catalyst used to effect copolymerization of a mixture of copolymerizable ingredients comprising (a) an alkenyl polysiloxane having the formula $$[(CH_2=CH)(CH_3)SiO]_4$$

and (b) a hydrogen polysiloxane having the formula $$(CH_3SiHO)_4$$

which process comprises incorporating diethyl thiourea with the platinum halide in the mixture of ingredients.

15. A composition of matter comprising (a) an olefinic polysiloxane having units of the formula $$R_aR'_bSiO_{\frac{(4-a-b)}{2}}$$

(b) a hydrogen polysiloxane having units of the formula $$R_aSiH_bSiO_{\frac{(4-a-b)}{2}}$$

(c) a platinum catalyst effective in causing copolymerization of (a) and (b), and (d) a nitrogen containing ligand selected from the class consisting of aromatic heterocyclic nitrogen compounds having the formula

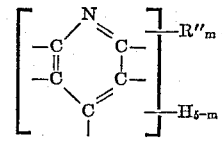

where R" is an alkyl group of from 1 to 6 carbon atoms, and $m$ is a whole number of from 0 to 5, inclusive, pyridazine, pyrazine, quinoline, 2,2'-biquinoline, bipyridine, naphthyridine, quinaldine, dialkyl formamides of the formula

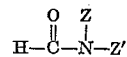

thioamides of the formula

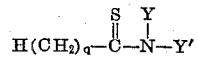

alkyl thioureas of the formula

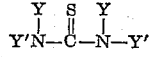

and ethylene thiourea, where Z and Z' are alkyl radicals of from 1 to 2 carbon atoms, and Y and Y' are members of the class consisting of hydrogen and alkyl radicals of from 1 to 2 carbon atoms, R is a member selected from the class consisting of alkyl, aryl, aralkyl, alkaryl, halogenated aryl, cyanoalkyl radicals, and mixtures of such radicals, R' is an organic radical selected from the class consisting of vinyl, allyl, methallyl, butenyl, and ethinyl radicals, $q$ is a whole number from 0 to 1, inclusive, $a$ has a value from 0 to 3, inclusive, $b$ has a value from 0.005 to 2.0, inclusive, and the sum of $a+b$ is equal to from 1.0 to 3, inclusive.

16. A composition of matter as in claim 15 in which the platinum catalyst and the ligand are present as a mechanical mixture.

17. A composition of matter as in claim 15 in which the platinum catalyst and the ligand are present as a complex.

18. A composition of matter comprising (a) an alkenyl polysiloxane having the formula $$[(CH_2=CH)(CH_3)SiO]_4$$

(b) a hydrogen polysiloxane having the formula $$(CH_3SiHO)_4$$

(c) a platinum halide, and (d) pyridine.

19. A composition of matter comprising (a) an alkenyl polysiloxane having the formula $$[(CH_2=CH)(CH_3)SiO]_4$$

(b) a hydrogen polysiloxane having the formula $$(CH_3SiHO)_4$$

(c) a platinum halide, and (d) 2,2'-biquinoline.

20. A composition of matter comprising (a) an alkenyl polysiloxane having the formula $$[(CH_2=CH)(CH_3)SiO]_4$$

(b) a hydrogen polysiloxane having the formula $$(CH_3SiHO)_4$$

(c) a platinum halide, and (d) 2,2'-bipyridine.

21. A composition of matter comprising a mixture of ingredients comprising (a) a polysiloxane having the formula $$[(CH_2=CH)(CH_3)SiO]_4$$

(b) a hydrogen polysiloxane having the formula $$(CH_3SiHO)_4$$

(c) a platinum halide, and (d) dimethyl formamide.

22. A composition of matter comprising a mixture of ingredients comprising (a) an olefinic polysiloxane having the formula $[(CH_2=CH)_2(CH_3)_2SiO]_4$, (b) a hydrogen polysiloxane having the formula $(CH_3SiHO)_4$, (c) a platinum halide, and (d) N,N'-diethyl thiourea.

23. A composition of matter comprising a mixture of ingredients comprising (a) an olefinic polysiloxane having the formula $[(CH_2=CH)(CH_3)SiO]_4$, (b) a hydrogen polysiloxane having the formula $(CH_3SiHO)_4$, (c) a platinum halide, and (d) thioacetamide.

24. A composition of matter comprising a mixture of ingredients comprising (a) an olefinic polysiloxane having the formula $[(CH_2=CH)(CH_3)SiO]_4$, (b) a hydrogen polysiloxane having the formula $(CH_3SiHO)_4$, (c) a platinum halide, and (d) ethylene thiourea.

References Cited by the Examiner
UNITED STATES PATENTS

| | | | |
|---|---|---|---|
| 2,823,218 | 2/58 | Spier et al. | 260—46.5 |
| 2,970,150 | 1/61 | Bailey | 260—448.2 |
| 3,071,561 | 1/63 | Bluestein | 260—46.5 |

LEON J. BERCOVITZ, *Primary Examiner.*

WILLIAM H. SHORT, *Examiner.*